June 10, 1969     R. J. KANE     3,449,000

DEMOUNTABLE HOSE COUPLING

Filed Sept. 5, 1967

INVENTOR.
ROBERT J. KANE.
BY
Willard S. Groen
ATTORNEY.

United States Patent Office 3,449,000
Patented June 10, 1969

3,449,000
DEMOUNTABLE HOSE COUPLING
Robert J. Kane, 5035 N. 12th St., P.O. Box 7044,
Phoenix, Ariz. 85014
Filed Sept. 5, 1967, Ser. No. 665,470
Int. Cl. F16l 33/22, 37/24
U.S. Cl. 285—174                    1 Claim

ABSTRACT OF THE DISCLOSURE

A quick connectable and disconnectable coupling for a hose to a supply pipe of simple and leakproof construction which securely holds to hose against inadvertent disconnection under rough use. The hose is secured to a coupling sleeve which has L-shaped slots formed therein. A locking bushing is threaded into a body member. The locking bushing has pin means radially disposed in its bore to cooperate with the L-shape slots to hold the members assembled.

Background of the invention

The field of this invention lies in a demountable hose coupling and is particularly directed to a quick connect and disconnect coupling for attaching a hose to a supply line.

Heretofore, rapid disconnect couplings have been unsatisfactory due to leakage and the effort and difficulty in applying and taking off the coupling from the pipe line. This was particularly bad in situations involving water lines having dissolved salts and acids which created deposits on the coupling rendering them inoperative and hard to manipulate.

Summary of the invention

An object of this invention is to provide a quickly connectable and disconnectable coupling for demountably attaching of a hose to a supply pipe.

Another object is to provide a coupling that is substantially free of inoperativeness due to clogging by deposits and dissolved solids in the fluid of the pipe to which the coupling is attached.

Description of the preferred embodiment

Figure 1:
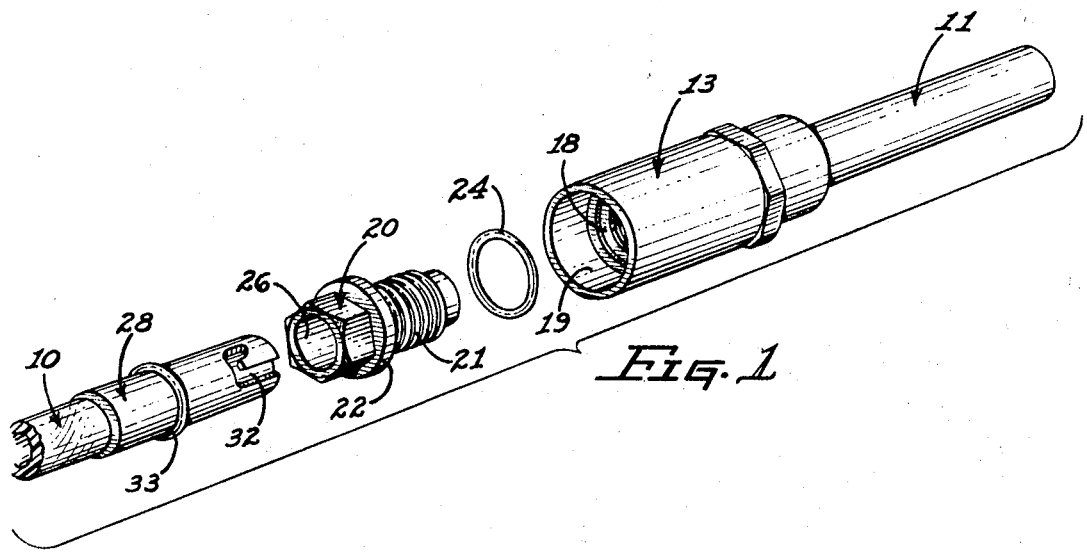
FIG. 1 is an exploded perspective view of one embodiment of the invention.
Figure 2:
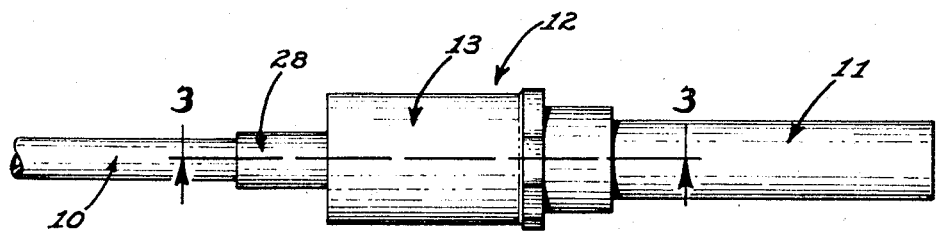
FIG. 2 is a side elevation of the assembled coupling shown in FIG. 1.

As an example of one embodiment of this invention, there is shown a quick disconnect coupling 12 for demountably attaching a hose 10 to a pipe 11 comprising the body member 13 having a bore 14 which is suitably fixed to the outside diameter 15 of the pipe 11. The intermediate portion of the body 13 is provided with a threaded bore 16 terminating at its inner end in an annular recess 17. Around the outer end of the threaded bore 16 is an O-ring counterbore 18. At the outer end of the body 13 is the enlarged counterbore 19.

A locking bushing 20 has a threaded outer shank 21 arranged to fit in the threaded bore 16 and a radially disposed flange 22 having an abutment surface 23 facing the bottom of the counterbore 18 so as to contain an O-ring seal 24 therebetween to prevent leakage through the threads 16 and 21 from escaping. The locking bushing 20 includes an inner bore 25 and a slightly larger outer O-ring receiving bore 26. Radially inwardly projecting locking pins 27 are provided within the inner bore 25 of the bushing 20.

The hose 10 is secured within the bore 29 of the coupling sleeve 28 by a suitable retainer tube 30 pressed in the bore 31 of the hose 10. L-shaped locking slots 32 are formed in the coupling sleeve 28 cooperating with the locking pins 27 for demountably attaching the hose 10 to the coupling 12. If desired, to prevent any leakage, an O-ring 33 carried in an annular groove 34 is provided in the outside diameter 35 of the coupling sleeve 28 which sealingly slidingly engages in the bore 26 of locking bushing 20.

Figure 4:
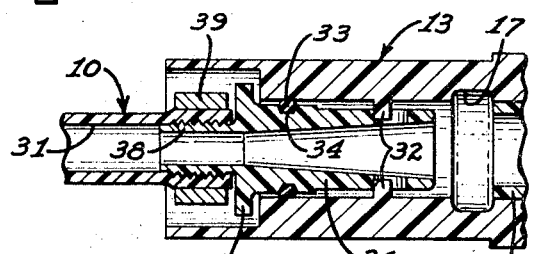
FIG. 4 is an enlarged sectional view showing a modification of the coupling shown in FIGS. 1, 2 and 3.
Figure 3:
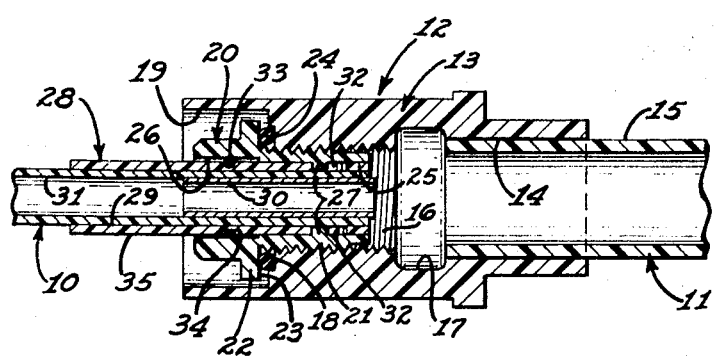
FIG. 3 is an enlarged sectional view on the line 3—3 of FIG. 2.

In FIG. 4 is shown a modification of the hose coupling sleeve such as the sleeve 36 having a flanged outer end 37 and a serrated shank 38 over which fits the bore 31 of the hose 10 and which is held in place by a suitable lock ring 39.

While the apparatus herein disclosed and described constitutes a preferred form of the invention, it is also to be understood that the apparatus is capable of mechanical alteration without departing from the spirit of the invention.

I claim:
1. A demountable hose coupling comprising in combination:
(A) a body member,
(B) a threaded bore formed in said body member,
(C) an O-ring seal counterbore formed in said body member around the outer end of said threaded bore,
(D) a locking bushing disposed entirely inside the body having a bore,
(E) a threaded outer shank formed on said locking bushing engaging in said threaded bore,
(F) a radially disposed flange formed on said locking bushing at the base of said threaded shank having a radial surface facing the bottom of said O-ring seal counterbore,
(G) an O-ring seal around the base of said threaded inner shank and secured between the bottom of said O-ring seal counterbore and said radial surface on said flange of said locking bushing,
(H) a hose coupling sleeve having a bore and arranged to have its outside diameter slidingly and rotatably engage the bore of said locking bushing,
(I) means to secure the sleeve to the hose,
(J) L-shaped locking slots formed in said hose coupling sleeve, and
(K) cooperating locking pin means radially disposed in the bore of said locking bushing arranged to be demountably engaged by said L-shaped slots, and
(L) a sealing means provided on the hose coupling sleeve outside diameter arranged to sealingly engage the bore of the locking bushing,
(M) the inside diameter of the sleeve being substantially equal to the outside diameter of the hose so that the sleeve is supported throughout its length by the hose.

References Cited

UNITED STATES PATENTS

| | | | |
|---|---|---|---|
| 542,364 | 7/1895 | Kopp | 285—376 X |
| 1,002,264 | 9/1911 | Gribben | 285—376 |
| 1,232,193 | 7/1917 | Bowes | 285—376 |
| 1,401,765 | 12/1921 | Davis | 285—376 X |
| 2,344,739 | 3/1944 | Schaff | 285—345 X |
| 2,523,585 | 9/1950 | Mueller et al. | 285—177 X |
| 3,120,966 | 2/1964 | Lyon | 285—247 X |

FOREIGN PATENTS 161,331    2/1955    Australia.

THOMAS F. CALLAGHAN, *Primary Examiner.*

U.S. Cl. X.R.

285—242, 402